United States Patent [19]
Cipolla

[11] Patent Number: 5,946,187
[45] Date of Patent: Aug. 31, 1999

[54] HEAT PIPE ARRANGEMENT FOR ENHANCING THE COOLING CAPACITY OF A LAPTOP COMPUTER

[75] Inventor: Thomas Mario Cipolla, Katonah, N.Y.

[73] Assignee: International Business Machines Corporation, Armonk, N.Y.

[21] Appl. No.: 08/935,988

[22] Filed: Sep. 23, 1997

[51] Int. Cl.[6] .................................. G06F 1/20; H05K 7/20
[52] U.S. Cl. .................. 361/687; 174/15.2; 165/104.33; 16/371
[58] Field of Search ...................................... 361/687, 699, 361/700; 174/15.2; 165/104.33; 16/371, 366; 602/16, 26; 623/39, 43

[56] References Cited

U.S. PATENT DOCUMENTS

| | | | |
|---|---|---|---|
| 2,877,033 | 3/1959 | Koetke | 602/26 |
| 4,493,316 | 1/1985 | Reed et al. | 602/26 |
| 5,383,340 | 1/1995 | Larson et al. | 361/700 |
| 5,621,613 | 4/1997 | Haley et al. | |
| 5,646,822 | 7/1997 | Bhatia et al. | 361/687 |
| 5,790,376 | 8/1998 | Moore | 361/700 |

OTHER PUBLICATIONS

Albert Yu, "The Future of Microprocessors", *IEEE Micro*, Dec. 1996, pp. 46–53.

*Primary Examiner*—Lynn D. Feild
*Assistant Examiner*—John D. Reed
*Attorney, Agent, or Firm*—Scully, Scott, Murphy & Presser; Daniel P. Morris, Esq.

[57] ABSTRACT

An arrangement for enhancing the cooling capacity of portable personal computers. The power dissipation of portable personal computers (PCS) is enhanced by transferring heat through a flexible heat pipe which is arranged in operative relationship with a novel hinge structure incorporating link elements pivotably interconnecting a display panel with a bottom processor housing so as to impart minimal bending stresses to the flexible heat pipe responsive to pivoting of the display panel, and which facilitates transferring the heat into an area at the rear of the display panel.

16 Claims, 6 Drawing Sheets

HEAT PIPE ARRANGEMENT FOR ENHANCING THE COOLING CAPACITY OF A LAPTOP COMPUTER

BACKGROUND OF THE INVENTION

The present invention relates to an arrangement for enhancing the cooling capacity of portable personal computers. More particularly, the invention is directed to the aspect of enhancing the power dissipation of portable personal computers (PCS) by transferring heat through a flexible heat pipe which is arranged in operative relationship with a novel hinge structure incorporating link elements pivotably interconnecting a display panel with a bottom keyboard housing so as to impart minimal bending stresses to the flexible heat pipe, and which facilitates transferring the heat into an area at the rear of the display panel.

The capacity and performance of portable personal computers, such as laptop computers, notebook computers or the like, has recently been enhanced to such an extent that; for example, since the beginning of 1996, the thermal dissipation requirements of portable personal computers (PCS) have increased from about 10 watts to 20 watts and even higher values. This increase in the thermal dissipation requirements is a result of ever increasing CPU performance and additional functionality; such as DVD, modem, audio and the like, which are provided by future PCS. As eludicated in an article by Albert Yu, "The Future of Microprocessors", IEEE Micro, December 1996, pages 46 through 53, the trend of increasing power dissipation in the form of heat for portable personal computers will continue in the foreseeable future. Accordingly, at the widely employed A4 form factor for a portable personal computer; for instance, the cooling limit for a portable PC without a cooling fan is currently approximately 15 to 20 watts. Thus, providing a greater cooling capacity than the current limits in order to meet the anticipated thermal dissipation requirements of future portable personal computers, represents not only a potential competitive advantage in industry, but also provides a significant product differentiation from currently available and commercially sold portable personal computers.

In order to meet the requirements for enhancing the cooling capacities of portable personal computers, pursuant to the invention, a personal computer, especially such as a laptop computer having an openable display panel and a keyboard articulated to the bottom thereof, incorporates a flexible heat pipe for transferring heat in an operative relationship with the hinge mechanism of the display panel which connects the latter to the bottom housing such that only minimal bending stresses are encountered by the heat pipe and which essentially transfers the heat into an area towards the rear of the display. At that location, the availability of an increased surface area and the presence therein of relatively few electronics facilitates an increased degree of heat dissipation into the ambient air or surroundings.

An extremely valuable area for dissipating heat on a laptop computer is the back of the display. This area is normally not used effectively because very few heat generating components are located in this area. Furthermore, it is difficult to transfer more heat to this area from the lower portion or bottom housing of the laptop computer because the means to implement this has to pass through a hinge forming the interconnection between the lower portion of the laptop computer and the display panel. Additionally, it is difficult to locate heat generating components, such as the CPU, in this area because the large number of signal wires which must pass through the hinge in order to communicate with the other components located in the lower portion of the laptop computer.

A well known device for conducting heat efficiently is a heat pipe. The heat pipe normally consists of a length of tubing, usually comprising copper, which is hermetically sealed with a fluid contained therein under a critical pressure such that, when one end of the pipe is in contact with a warm body, the heat from the warm body causes the fluid to boil. The normally vaporous fluid travels to the colder end of the tube and condenses thus taking energy therewith to the other end of the tube. Transfer rates of greater than 100 times that of conducting through copper can be achieved in this manner. Moreover, the length of the tube has little impact on the transfer rate of the heat pipe.

DISCUSSION OF THE PRIOR ART

The use of heat pipes for the purpose of dissipating power or to provide cooling capacities for computers, for example, such as personal computers of the laptop configuration, is presently known and employed in this technology.

Thus, Haley et al. U.S. Pat. No. 5,621,613 discloses a laptop computer wherein a heat pipe structure connects with a device contained in a keyboard housing for dissipating heat.

Although the foregoing publication discloses the use of heat pipes for conducting and dumping heat generated during the use of the computer towards the back of a display or housing structure, inasmuch as the heat pipe is generally a solid hermetically sealed unit, it does not readily lend itself to mechanical motion of one end while the other end remains fixed, as would be the instance if a heat pipe were to be passed directly through the hinge of a laptop computer.

SUMMARY OF THE INVENTION

Accordingly, pursuant to the present invention, there is provided a novel flexible heat pipe arrangement in which the heat pipe is operatively attached to the hinge construction of a laptop computer interconnecting a lower housing with a foldable display panel, and wherein, in the event the heat pipe is bent or flexed in response to the pivoting motion of the hinge of the computer structure, the stresses of bending would be distributed over the length of the flexible portion of the heat pipe, thereby maintaining such generated bending stresses at a minimum and resultingly acceptable level over substantially the life expectancy of the laptop computer.

Accordingly, it is an object of the present invention to provide a novel cooling arrangement for portable personal computers, particularly such as laptop computers, which enhances the cooling capacity thereof, and wherein a uniquely actuated hinge structure which is present between a lower housing portion containing the processor and various electronics and a display housing containing a display panel operatively incorporates a flexible heat pipe for transferring off generated heat, while generating only minimal bending stresses in the heat pipe during flexural movement thereof.

BRIEF DESCRIPTION OF THE DRAWINGS

Reference may now be had to the following detailed description of preferred embodiments of the invention, taken in conjunction with the accompanying drawings; in which.

DETAILED DESCRIPTION

Figure 1:
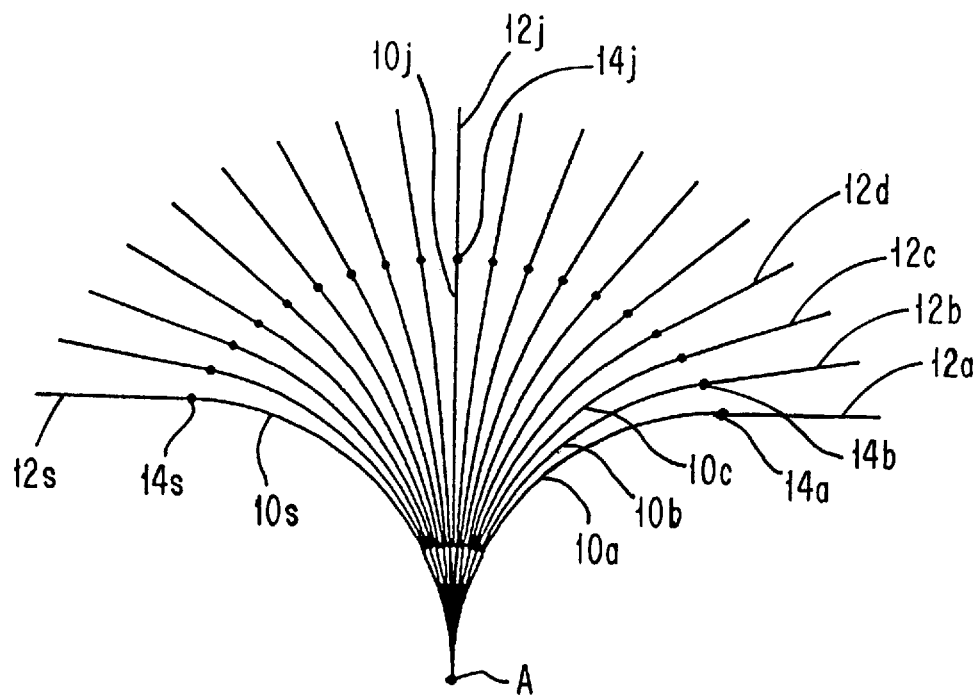
FIG. 1 shows a schematic representation of a bent beam with constant radius at several bending angles.

A very valuable area for dissipating heat on a portable computer (known as a "laptop") is the back of the display. This area is normally not used effectively to dissipate heat because very few heat generating components are located in this area and further, it is difficult to convey heat to this area from the lower portion, such as the keyboard or processor region and housing of the laptop because the means to do so must normally pass through a hinge structure forming a connection between the lower portion or housing of the laptop and the display panel. Moreover, it is difficult to locate heat generating components, such as the CPU, in this area because the large number of signal wires which must pass through the hinge in order to communicate with the other components located in the lower portion of the laptop.

A well known device for transferring heat efficiently is a heat pipe. The latter generally consists of a length of tubing, preferably copper, which is hermetically sealed with a fluid contained therein at a critical pressure such that when one end of the pipe is in contact with a warm body the heat from the warm body causes the fluid to boil and become vaporous. The vaporous fluid travels to the colder end of the tube and condenses, thereby taking energy with it to the other or colder end of the tube. Transfer rates of greater than 100 times that of conducting through copper can be achieved in this manner. Further, the length of the tube has little impact on the transfer rate of the heat pipe.

Since the heat pipe is a solid hermetically sealed unit, it does not readily lend itself to any mechanical motion of one end while the other end remains fixed, as would be the case if a heat pipe were passed directly through the hinge of a laptop. However, recent developments in heat pipe technology have produced a heat pipe made up of a flexible bellows with solid tubes soldered or welded on each end, this structure being essentially similar to a flexible drinking straw. This tube structure is then formed into a heat pipe by adding the usual internal components; in effect, the evaporant fluid and a wick, and is then hermetically sealed after proper internal pressure. The result is a heat pipe that can be flexed in the section constituted of the bellows.

While at a first view this appears to be an obvious way to transfer heat from the main body of a laptop computer through the hinge and to the area behind the display, this is not a straightforward or simple task.

In order to produce a reliable product, flexing such a heat pipe must be implemented so as to minimize any bending stresses in the material in order to minimize the possibility of failure. To be able to do this, it is desirable to flex the heat pipe under a constant radius. In this manner, the maximum encountered bending stress is minimized by distributing the total stress evenly along the flexible portion of the tube. In addition, it is desirable to maintain the inflexible or rigid portions of the tube tangent to the adjoining flexible portion in order to prevent any high stresses from being generated at this point or juncture.

FIG. 1 shows diagrammatically (i.e. the centerline) of a tube theoretically bent from +90 degrees to −90 degrees in 10 degree increments. All curved portions 10a through 10s of the lines are of equal length, in this case 55 millimeters, and each curved portion 10a through 10s is of constant radius. Each end of curved portions 10a through 10s is fixed in space at point A and is vertically tangent at that point. At the end of each curved portion of the centerline 10a through 10s there is present a short linear segment 12a through 12s which is tangent to the curved line at each end point; wherein as a reference, points 14a through 14s are shown at the locations the straight or linear segments 12a–12s and curved portions 10a–10s meet. If a heat pipe were to be incorporated into a laptop computer so as to that flex upon opening and closing of the display panel, the sequence shown in FIG. 1 would be the most desirable manner of implementation in order to minimize the bending stresses and maximize reliability and dependability of the heat pipe.

Figure 2:
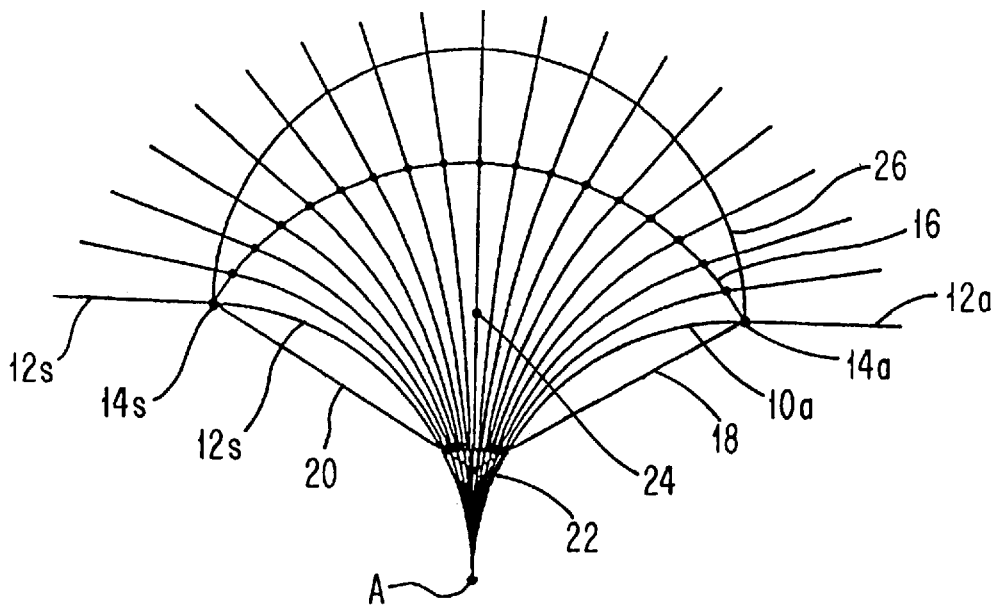
FIG. 2 shows a similar schematic as represented in FIG. 1.

FIG. 2 shows the curves and points as represented in FIG. 1 and in addition, employing the points 14a, 14j and 14s where the straight or linear segments and curved portions meet of the first, last and middle illustrated curves, an arcuate segment 16 is drawn through these points. This arc 16 is a very close approximation (within 77 micrometers) of the other sixteen end points 14b through 14i and 14k through 14r. Furthermore, radial lines 18 and 20 are shown as well as the center of the arc segment 22.

Also shown is point 24 which represents the point of intersection between the horizontal lines 12a and 12s and the vertical line 12j and arcuate segment 26 which has a point 24 as its center and points 12a and 12s at the ends of the arc segment. The angle between the radial lines 18 and 20 is approximately 120 degrees.

The foregoing represents the problem which is encountered in incorporating a flexible heat pipe into a pivoting laptop display. In case one end of a flexible heat pipe were to be permanently attached to the base or lower housing of the laptop and the other end attached to the pivotably connected display panel, the end which is attached to the display panel must of necessity travel in a circular arc and the angle subtended by the arc must be equal to the angle through which the display panel moves. Were the pivot point of the hinge to be selected at point 24, the motion of the end of the flexible portion of the heat pipe would follow arcuate segment 26. While the points at +90 degrees and −90 degrees are an exact match with the ideal curve of minimum stress approximated by arcuate segment 16, the deviation in the middle is approximately 15 mm for a flexible segment which is 55 mm in length.

In the event that the pivot point were to be chosen at point 22, the angle of travel of the display panel would not match the angle of travel which the end of the flexible portion of the heat pipe would need to follow (180 degrees vs. 120 degrees).

Further investigation evidences that there is no pivot point which will enable the end of the flexible portion of the heat pipe to travel along the ideal path as shown in FIG. 1, or even at an approximation therewith.

The present invention, on the other hand, enables the display cover or panel to travel in such a path that a point at which a flexible heat pipe is attached will closely follow the ideal path shown in FIG. 1, in essence, the arcuate segment 16. As mentioned above, following the ideal path is not enough, the angle of the rigid portion of the heat pipe must also be maintained tangent to the flexible portion. The invention also allows for a very good approximation of that desirable aspect.

Figure 3:
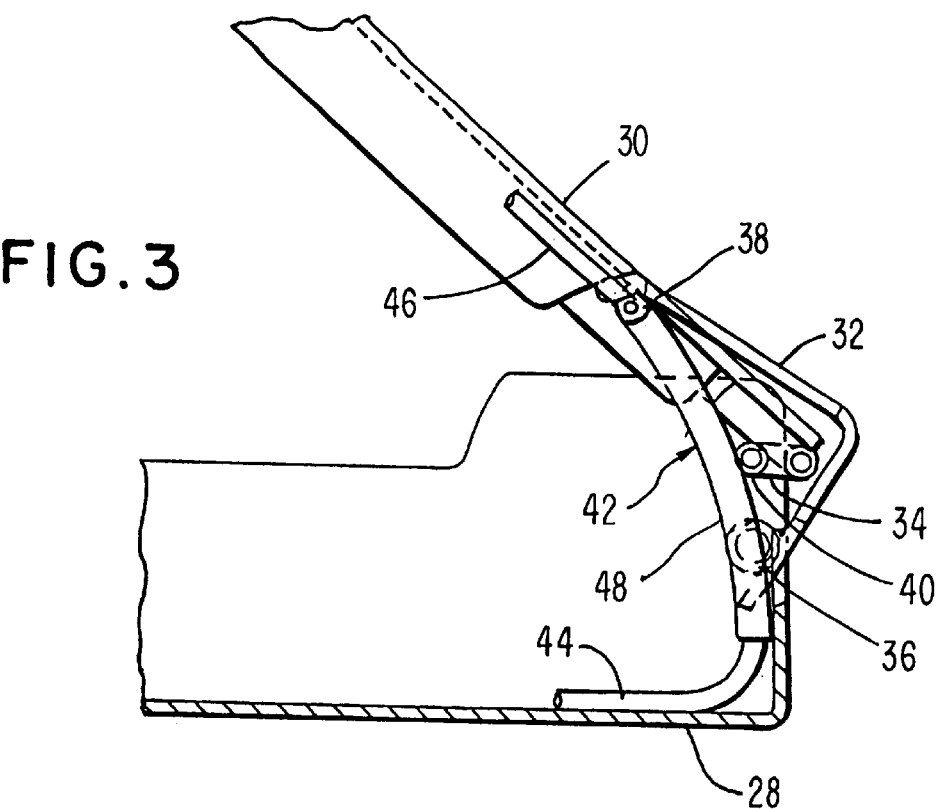
FIG. 3 shows a side view of a partially open portable computer with the bottom housing thereof shown in a sectional view.

FIG. 3 shows a side view of a partially opened laptop computer with the bottom housing 28 being illustrated in a sectional view. The display cover or panel 30 is attached to the bottom housing 28 through two links 32 and 34. Link 32 has one pivot point 36 attached to the bottom housing 28 and the other pivot point 38 thereof attached to the display panel 30. Similarly, link 34 has one pivot point 40 attached to bottom housing 28 and the other pivot point 41 attached to display panel 30. Heat pipe 42 essentially consists of one rigid end portion 44, a flexible portion 48 in the middle or center portion thereof, and another rigid end portion 46. Rigid end 44 of the heat pipe 42 is mechanically attached to the bottom cover 28 and the other rigid end 46 of heat pipe 42 is mechanically attached to the display cover 30. The center point where the rigid end portion 44 of the heat pipe 42 and the flexible middle portion 48 of the heat pipe meet corresponds to point A in FIGS. 1 and 2. Pivot point 36 of link 32 corresponds to intersection point 24 shown in FIG. 2. When the display cover or panel is opened from its closed position (−90 degrees) to its fully opened position (+90 degrees), the motion of pivot point 38 on link 32 and display panel 30 will follow the arcuate segment 16 shown in FIG. 2 since it pivots from pivot point 36 which corresponds to intersection point 24 in FIG. 2. The center point where the rigid portion 46 of the heat pipe and the middle flexible portion 48 of the heat pipe 42 meet lies at the same point as that of pivot point 38. Obviously, in a three dimensional representation, these two physical points would be displaced from each other in a direction extending perpendicular to the plane of the paper. Since the movable end of the flexible portion 48 of heat pipe 42 moves with the pivot point 38 on link 32, this end closely follows (within 77 micrometers for a flexible portion of a heat pipe possessing a length of 55 mm) the ideal path illustrated in FIG. 1.

Figure 4:
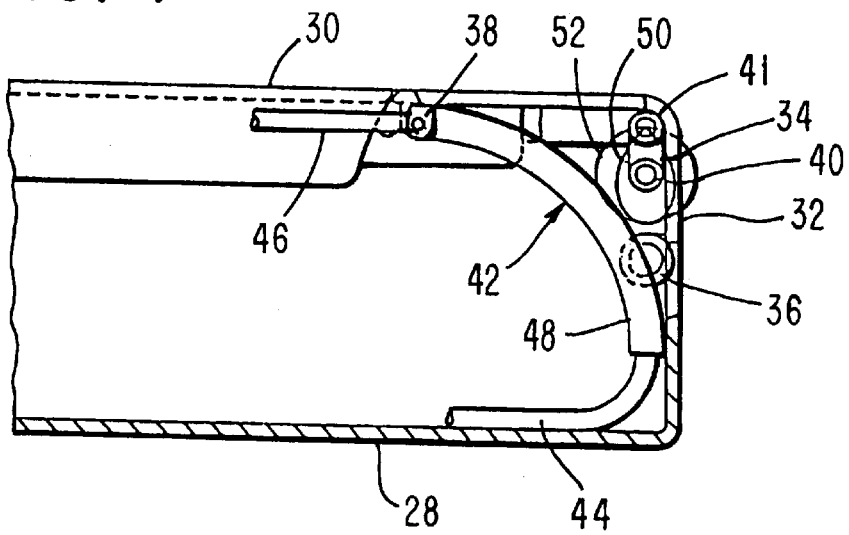
FIG. 4 shows the same mechanism as shown in FIG. 3 but with the display cover in the fully closed position.

In order to minimize the bending stresses in the flexible portion 48 of heat pipe 42, rigid portion 46 must also remain tangent to the flexible portion 48. FIG. 4 shows the same mechanism as shown in FIG. 3, but with display panel 30 being in the fully closed position. In this position, the pivot point 41 on link 34 and display panel 30 corresponds to point 24 represented in FIG. 2, in effect, the point lies on a vertical line which passes through pivot point 36 and a horizontal line which passes through pivot point 38. It is required to have the rigid portion 46 to remain tangent to flexible portion 48 by having pivot point 41 follow an ideal path to maintain this relationship, this ideal path being shown in FIG. 4 as path 50. While it should be apparent to those skilled in the art that it would be possible to construct a device which would enable pivot point 41 to follow such a path, for example, by means of a cam, a more practical device is to provide a simple pivoting link such as link 34. The link allows pivot point 41 to follow the circular path 52 which is an approximation of path 50. This introduces some degree of error in maintaining the rigid portion 48 tangent to flexible portion 48. However, it is noted that in the fully closed position where the bending stress in flexible portion 48 is at its highest, the two curves 50 and 52 are coincident, and therefore employing the approximate curve 52 at this point introduces no additional bending stress. This condition also occurs in the fully opened position. When the display panel 30 is in an intermediate opening position where the maximum error is encountered, a portion of the bending stress has already been relieved by the natural straightening of flexible heat pipe portion 48. Thus, the small increase in the bending stress due to the deviation from the ideal position of pivot point 41 is more than offset by the natural straightening of flexible heat pipe portion 48. The maximum tangent error occurs at approximately 45 and 135 degrees and, for a flexible portion having a length of 55 mm, this error is slightly less than eight degrees.

Figure 5:
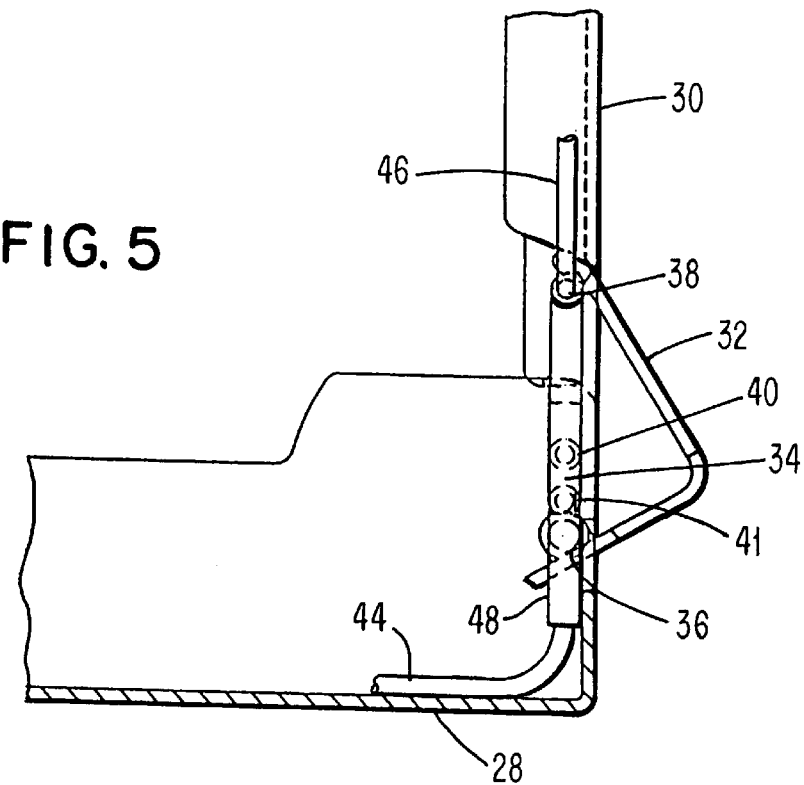
FIG. 5 shows another side view of the mechanism of FIG. 3 with display cover being in the perpendicular or upright open position.
Figure 6A:
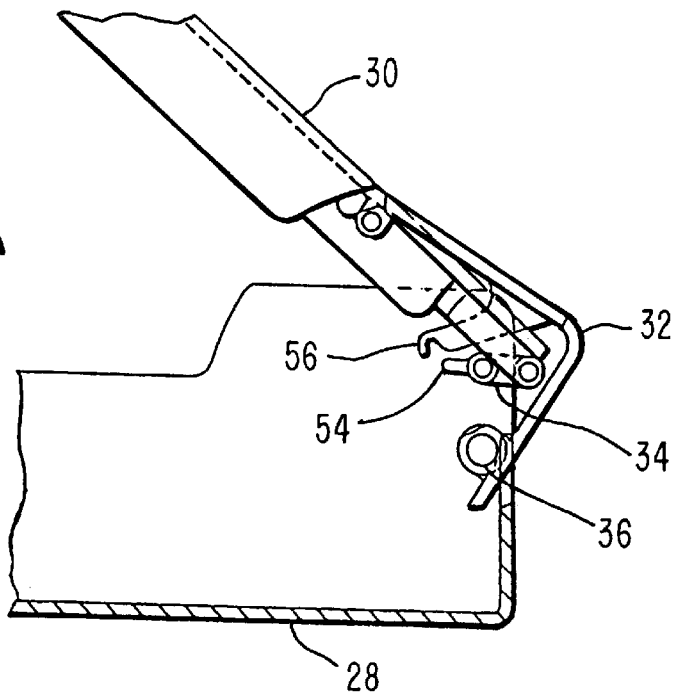
FIGS. 6A through 6E show respective conditions of the hinge mechanism while the opening of the display cover progresses through the upright position.
Figure 6B:
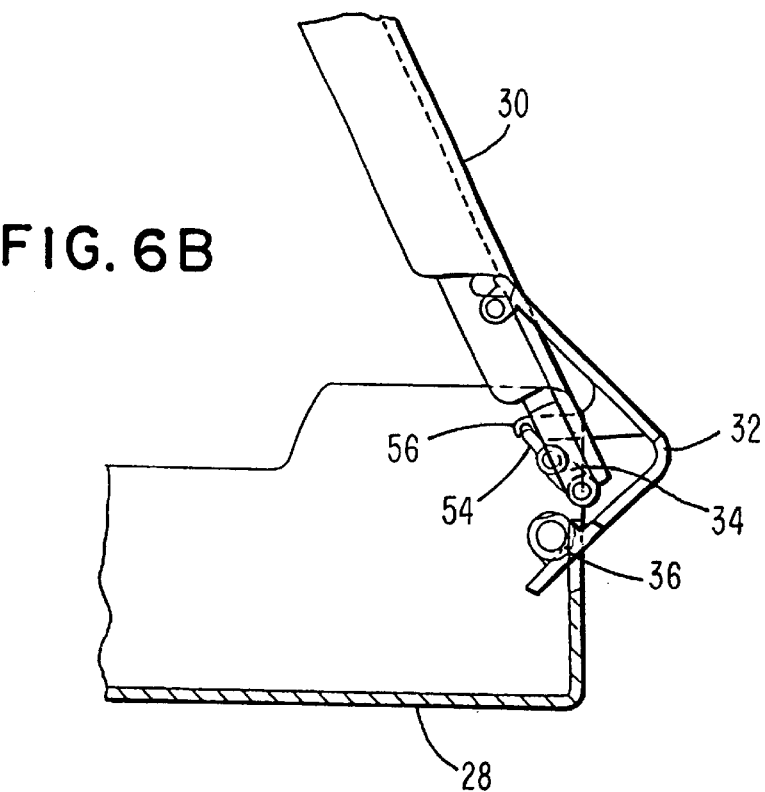
Figure 6C:
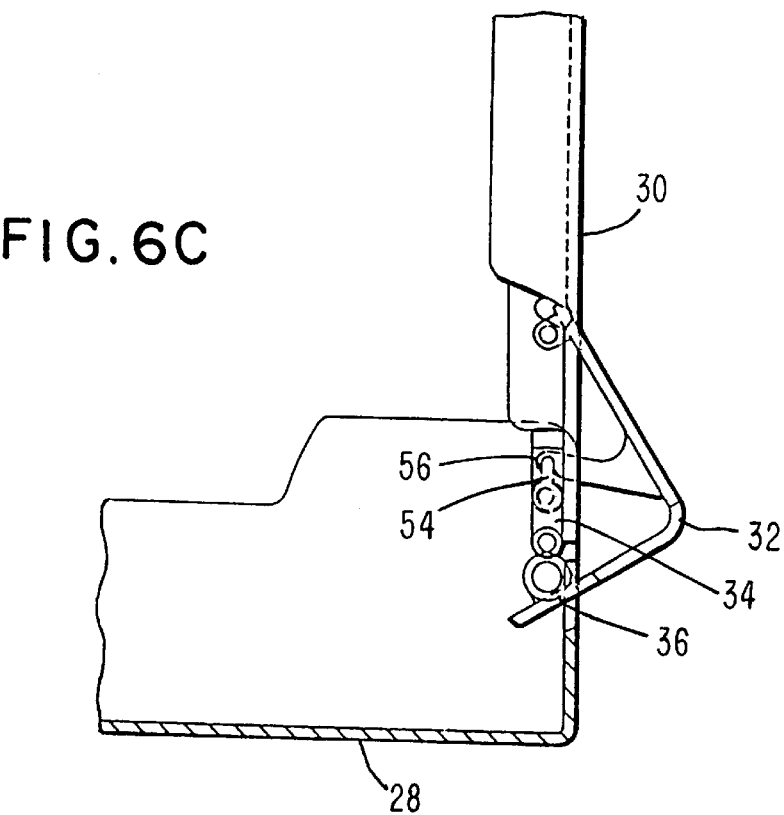
Figure 6D:
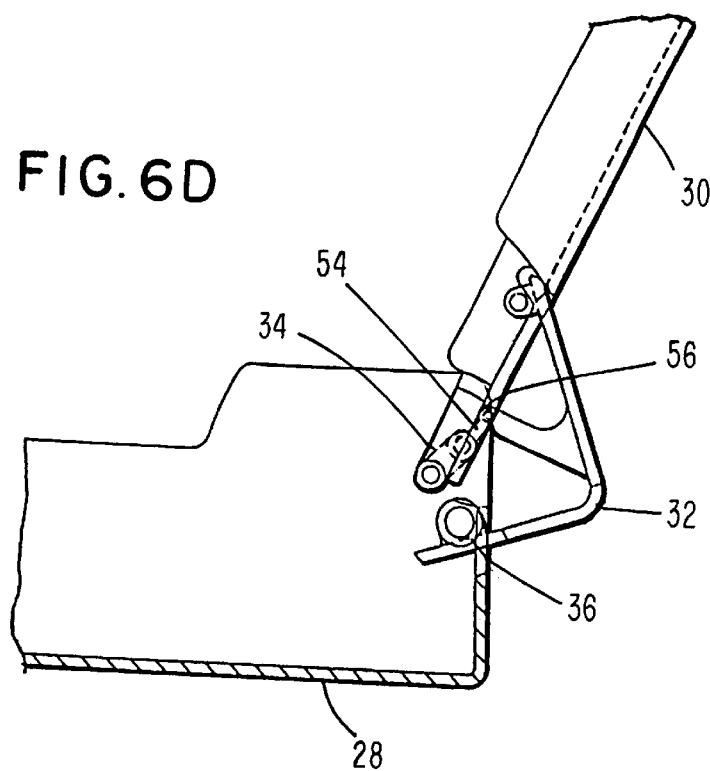
Figure 6E:
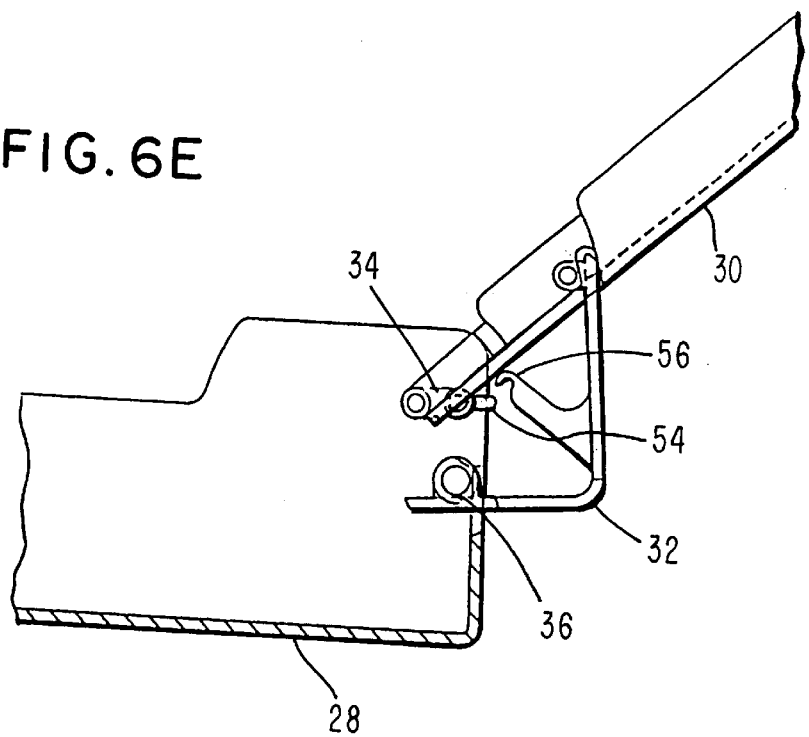

FIG. 5 illustrates another side view of this mechanism, with the display panel 30 being shown in the perpendicular position (referred to herein as zero degrees). In this position, all four pivot points 38, 40, 41 and 36 are co-linear. This is known as a bistable condition, in effect, as the display panel 30 is rotated counterclockwise from this point, link 34 can rotate either counterclockwise or clockwise. It is desirable for link 34 to rotate counterclockwise since if it were to be allowed to rotate clockwise, very high positioning errors would occur, resulting overstressing the flexible heat pipe portion 48. This problem is solved by adding a single-tooth "gear" 54 to link 34 and a single tooth space or gap 56 to link 32, as shown in FIG. 6A. The sequence of FIGS. 6A through 6E represents the mechanism progressing through zero degrees, the critical point at which where bistability is encountered. The sequence shows tooth 54 engaging tooth space or gap 56 prior to reaching zero degrees, thereby forcing the link 34 to move in the correct direction to zero degrees, and then disengaging after reaching zero degrees. The mechanism operates equally well when the display panel 30 moves either clockwise or counter clockwise through zero degrees.

Figure 7:
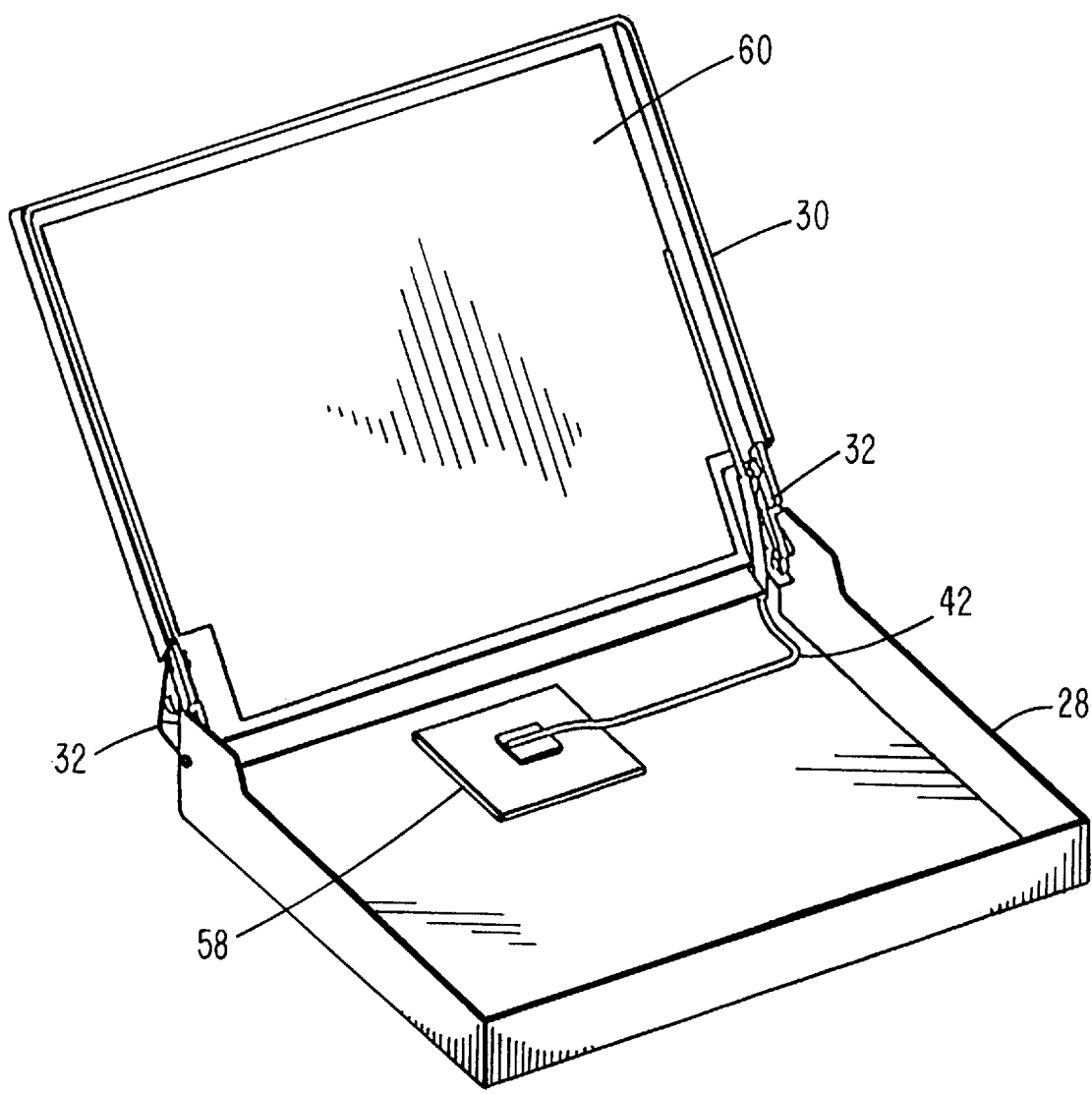
FIG. 7 shows a perspective view of a portable personal computer case with a typical heat producing electronic component such as a processor, a flexible heat pipe, a heat spreader and the hinge mechanism as described herein.

FIG. 7 shows a perspective view of a laptop case with a typical heat producing electronic component 58, such as a processor, a flexible heat pipe 42, a heat spreader 60 and the hinge mechanism as described herein. Heat pipe 42 is attached to the electronic component 58 by means of low thermal resistance methods, as is well known in the art. The heat is conveyed through the heat pipe and transferred to heat spreader 60 which is also attached to the heat pipe by means of a low thermal resistance method. Heat is then transferred to the outside of the panel and convected away through ambient air.

Any number of flexible heat pipes 42 can be employed across the width of the hinge to accommodate more extensive power of heat-dissipation.

While there has been shown and described what are considered to be preferred embodiments of the invention, it will, of course, be understood that various modifications and changes in form or detail could readily be made without departing from the spirit of the invention. It is, therefore, intended that the invention be not limited to the exact form and detail herein shown and described, nor to anything less than the whole of the invention herein disclosed as hereinafter claimed.

Having thus described my invention, what I claim as new, and desire to secure by Letter Patent is:

1. An arrangement for dissipating heat generated by at least one electronic component of a computer located in a bottom housing for a processor and a display panel; linkage means for hingedly connecting said display panel to a rear edge of said housing, said heat dissipating arrangement comprising a heat pipe formed from a length of tubing have a first rigid end portion fastened to said housing and a second rigid end portion fastened to said display panel, and a flexible middle portion of said heat pipe having opposite ends fastened to the respective rigid end portions thereof, the first end of said heat pipe being connected to said at least one heat-generating electronic component and the opposite second end of said heat pipe being connected to a heat spreader at a rear surface of said display panel for conducting heat from said electronic components to said heat spreader; said linkage means comprising a plurality of articulated link elements which are pivotable relative to each other during opening and closing of said display panel so as to impart a predetermined path of movement to at least the flexible middle portion of said heat pipe to maintain bending stresses generated in said heat pipe at a minimum value, at least one said link element mounting a single-finger gear element, and a second said link element which is articulated to said one link element including a structure possessing a gap into which said gear element engages during predetermined rotational positions of said display panel so as to cause said flexible middle portion of the heat-pipe to assume a specified path of movement for minimizing bending stresses generated in said heat pipe.

2. An arrangement as claimed in claim 1, wherein the ends of said heat pipe are tangentially deflectable relative to the flexible middle portion of said heat pipe responsive to pivoting movement of said display panel so as to be rotatably movable relative to each other.

3. An arrangement as claimed in claim 2, wherein the path of movement of said flexible middle portion of the heat pipe subtends generally an arc.

4. An arrangement as claimed in claim 2, wherein the path of movement of the end of the heat pipe which is fastened to the display panel subtends a circular arc substantially analogous to the pivotal motion of the display panel.

5. An arrangement as claimed in claim 1, wherein said heat spreader comprises a plate element mounted in said display panel for dissipating heat to the surroundings.

6. An arrangement as claimed in claim 1, wherein said heat pipe is made from stainless steel or copper tubing.

7. An arrangement as claimed in claim 1, wherein a plurality of said heat pipes are arranged in said computer.

8. An arrangement as claimed in claim 1, wherein said computer is a laptop computer.

9. A method of dissipating heat generated by at least one electronic component of a computer located in a bottom housing for a processor and a display panel; hingedly connecting said display panel to a rear edge of said housing by a hinging structure, said heat dissipating method comprising fastening a first rigid end of a heat pipe formed from a length of tubing to said housing and fastening a second rigid end portion to said display panel, a flexible middle portion of said heat pipe having opposite ends being connected to the respective rigid end portions thereof, connecting the first end of said heat pipe to said at least one heat-generating electronic component and connecting the opposite second end of said heat pipe being to a heat spreader at a rear surface of said display panel for conducting heat from said electronic components to said heat spreader; forming the hinging structure from a plurality of articulated link elements which are pivotable relative to each other during opening and closing of said display panel so as to impart a predetermined path of movement to at least the flexible middle portion of said heat pipe to maintain bending stresses generated in said heat pipe at a minimum value, at least one said link element mounting a single-finger gear element, and a second said link element which is articulated to said one link element including a structure possessing a gap into which said gear element engages during predetermined rotational positions of said display panel so as to cause said flexible middle portion of the heat-pipe to assume a specified path of movement for minimizing bending stresses generated in said heat pipe.

10. A method as claimed in claim 9, wherein the ends of said heat pipe are tangentially deflectable relative to the flexible middle portion of said heat pipe responsive to pivoting movement of said display panel so as to be rotatably movable relative to each other.

11. A method as claimed in claim 10, wherein the path of movement of said flexible middle portion of the heat pipe subtends generally an arc.

12. A method as claimed in claim 10, wherein the path of movement of the end of the heat pipe which is fastened to the display panel subtends a circular arc substantially analogous to the pivotal motion of the display panel.

13. A method as claimed in claim 9, wherein said heat spreader comprises a plate element mounted in said display panel for dissipating heat to the surroundings.

14. A method as claimed in claim 9, wherein said heat pipe is made from stainless steel or copper tubing.

15. A method as claimed in claim 9, wherein a plurality of said heat pipes are arranged in said computer.

16. A method as claimed in claim 9, wherein said computer is a laptop computer.

* * * * *